Nov. 6, 1928. 1,690,953

L. SCHÖN

ALTERNATING CURRENT INDUCTION MOTOR

Filed Oct. 2, 1926  2 Sheets-Sheet 1

Nov. 6, 1928.

L. SCHÖN

ALTERNATING CURRENT INDUCTION MOTOR

Filed Oct. 2, 1926   2 Sheets-Sheet 2

Patented Nov. 6, 1928.

1,690,953

UNITED STATES PATENT OFFICE.

LUDWIG SCHÖN, OF ESSEN, GERMANY, ASSIGNOR TO FRIED. KRUPP AKTIENGESELL-
SCHAFT, OF ESSEN-ON-THE-RUHR, GERMANY.

ALTERNATING-CURRENT INDUCTION MOTOR.

Application filed October 2, 1926, Serial No. 139,164, and in Germany March 13, 1924.

The invention relates to the alternating current induction motor described in our former application for Letters Patent (Serial Number 13,827), filed March 7th, 1925, Patent No. 1,675,960, July 3, 1928, and has for its object to so improve this motor that its manufacture is considerably simplified and its costs are lowered accordingly. This is obtained by the fact that the auxiliary rotor carrying the exciting winding is arranged between the stator and the rotor and constitutes an iron body closed in circumferential direction and is provided on its outer and inner side with slots designed to receive the exciting winding.

In the accompanying drawings is illustrated an embodiment of the improved motor by way of example. In these drawings.

Figure 1:
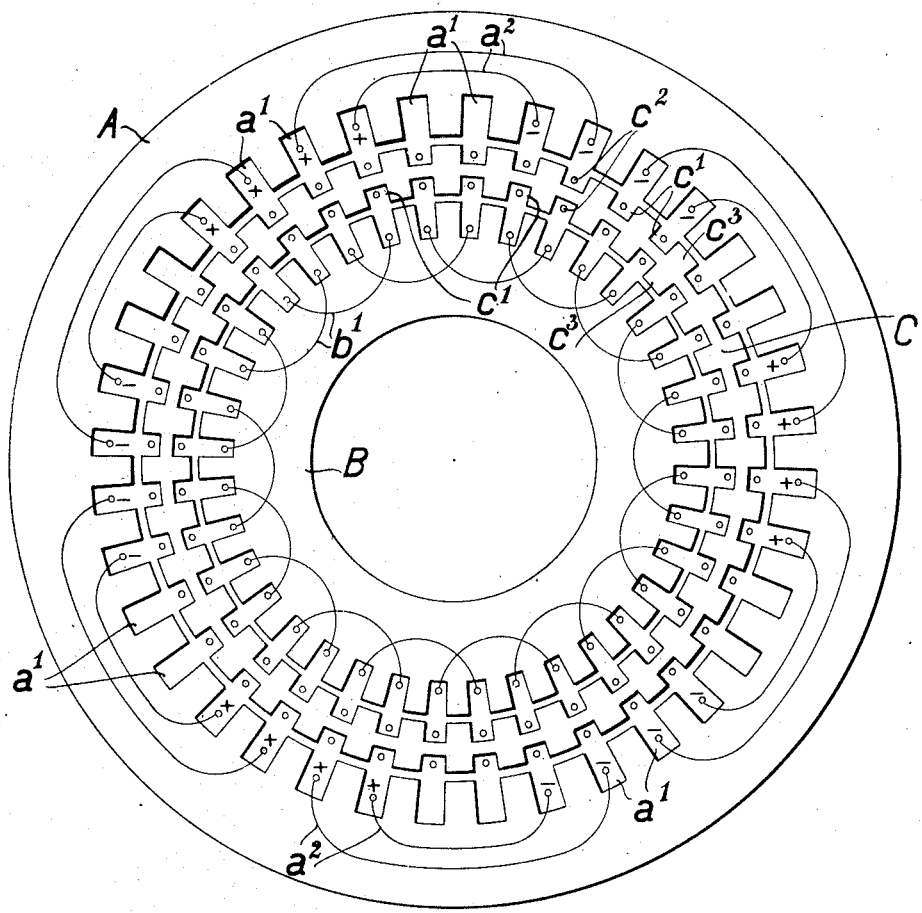
Fig. 1 is a diagrammatic front view of the stator, auxiliary rotor and rotor.

A denotes the stator, B the rotor, and C the auxiliary rotor arranged between them. The stator A is provided on its inner side with slots $a^1$ lodging a winding $a^2$, which is connected to a source D, Fig. 2, of single-phase alternating current. Part of the slots $a^1$ which are left empty in Fig. 1, serve to receive an auxiliary winding $a^3$ (auxiliary phase) which is operative only in the starting and is adapted to be switched off by special means, Fig. 2.

Figure 2:
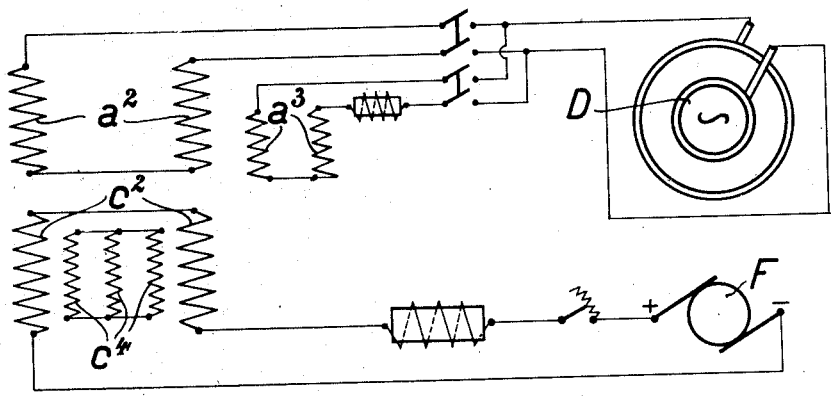
Fig. 2 shows a wiring diagram of the motor.
Figure 2:
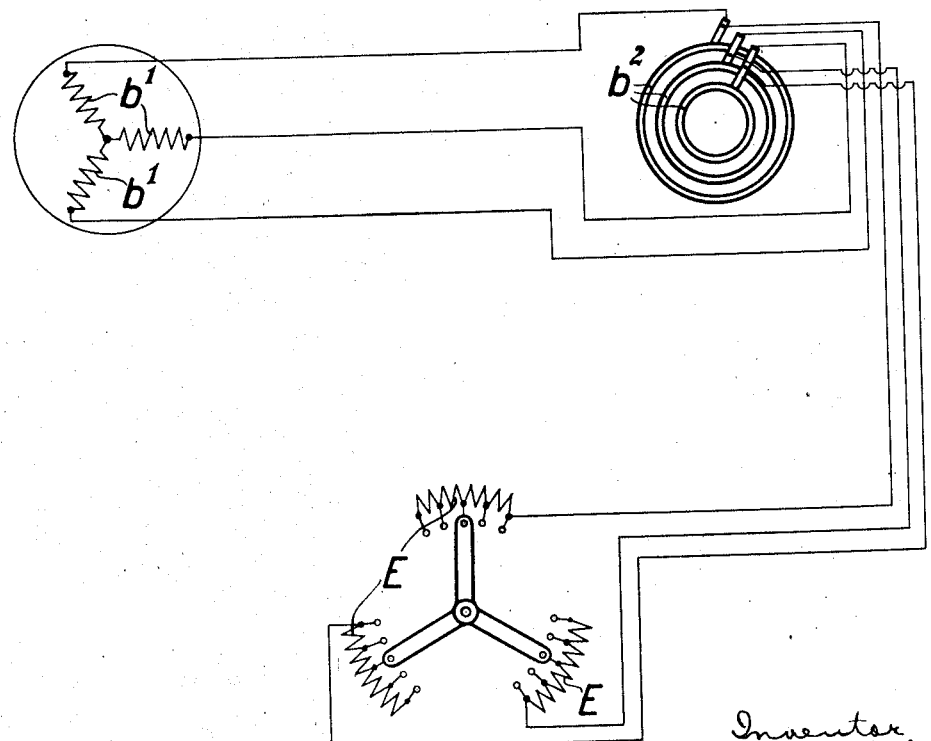

The rotor B carries a three-phase winding $b^1$ the ends of which are, on the one hand, in star connection with one another and, on the other hand, connected with three collector rings $b^2$, Fig. 2, mounted on the rotor shaft, by which rings said ends are in connection with a starting resistance E, Fig. 2.

The auxiliary rotor C consists of a drum the iron shell of which has milled into it on the outer and inner side slots $c^1$ arranged in pairs opposite each other and designed to receive the exciting winding $c^2$. This winding $c^2$ is connected to a source F of continuous current, Fig. 2, and so arranged that the teeth $c^3$ lying between the slots on the outer shell side possess a polarity opposite to that of the teeth on the inner side, the sense of direction of the flux alternating with every pole-pitch, and that, besides, in the central portion, lying between the teeth $c^3$, of the auxiliary rotor, points which are distant from each other by the distance of adjacent poles, have the same magnetic potential. Besides this, the auxiliary rotor carries in its slot $c^1$ a polyphase short-circuit winding $c^4$, not shown in Fig. 1 but in Fig. 2.

In order to start the described motor, either without load or under load, the stator winding $a^2$ together with the said auxiliary phase $a^3$, Fig. 2, is switched in first while the rotor winding $b^1$ is open and the winding $c^2$ of the auxiliary rotor unexcited. Under the action of the two-phase rotating field produced by the stator by means of the auxiliary phase and of the short-circuit currents in the winding $c^4$ of the auxiliary rotor C, the latter starts in a definite sense of rotation, viz., in the sense of the rotation of the rotating field produced by the auxiliary phase, and will soon reach a number of revolutions not very different from synchronism. If, now, the auxiliary phase is switched off, the revolving auxiliary motor C acts on the two oppositely revolving rotating fields, into which the single-phase alternating stator field may be thought resolved according to a common view, in such a manner that the rotating field revolving in the sense of rotation of the auxiliary rotor C is considerably boosted, while the oppositely revolving rotating field is caused to practically disappear. By the cooperation of the rotating field revolving in the same sense as the auxiliary rotor, with the short-circuit current induced in the auxiliary rotor a turning moment is generated by which the rotation of the auxiliary rotor and thus the rotating field itself, revolving in the same sense, are maintained. If, now, the exciting winding $c^2$ arranged on the auxiliary rotor C is connected with the source F of continuous current, the auxiliary rotor C becomes in a manner the rotor of a synchronous motor by rotating synchronously with the operative rotating field of the stator and taking in this rotating field such a position that opposite poles follow each other on the magnetic path of the lines of force, which means that e. g. a north pole of the stator is opposite to a south pole of the auxiliary rotor and that the north pole, allotted to said south pole, of the auxiliary rotor, is opposite to a south pole of the rotor. The maintenance of the rotating field revolving in the same sense as the auxiliary rotor is thus secured even when the motor is considerably overloaded. This fact renders it possible to start the rotor B by means of starting resistances exactly in the manner as the rotor of a multiphase motor. For, as the exciting winding $c^2$ is so chosen, as described above, that no difference of potential exists in the direction of the circumference of the auxiliary rotor, the magnetic flux in the latter in the direction of the circumference is subdued. Hence, the rotating field revolving in the stator is forced to traverse the auxiliary rotor in radial direction and to close itself through the rotor B, so that the rotor winding $b^1$ is linked with said rotating field exactly as in a multiphase motor. In order to obtain the turning moment required for starting the motor, it is, therefore, only necessary to close the rotor winding $b^1$ by switching in the starting resistances E, Fig. 2, a comparatively high mechanical load of the motor being admissible, as a starting turning moment constituting a multiple of the normal turning moment may be easily obtained. According to the strength chosen for the exciting current in the winding $c^2$ the phase-displacement between the strength and the tension of the single-phase current supplied to the stator winding $a^2$ may be influenced as desired the same as in an ordinary synchronous motor. Therefore this phase-displacement may, for instance, be reduced or entirely removed, which means that a power factor of cos $\varphi = 1$ may be imparted to the motor, or the lag of the current with regard to the tension may be converted into a lead of the current.

I claim:

An alternating current induction motor comprising a stator, a rotor and an auxiliary rotor arranged between the stator and rotor and consisting of a drum having an iron shell provided on its inner and outer side with slots, a stator winding and a rotor winding one of said windings being connected to a source of alternating current, a short circuit armature winding carried by the auxiliary rotor, and an exciting winding arranged in the inner and outer slots of said iron shell in such a manner that in the central portion of said shell corresponding points which are distant from each other by the distance of adjacent poles have the same magnetic potential, the magnetic flux generated by said exciting winding passing through the stator, the auxiliary rotor and the rotor in a path traversing the auxiliary rotor in radial direction.

The foregoing specification signed at Cologne, Germany, this 9th day of September, 1926.

LUDWIG SCHÖN.